(12) United States Patent
Mate et al.

(10) Patent No.: US 7,028,098 B2
(45) Date of Patent: Apr. 11, 2006

(54) SELECTIVE ROUTING OF DATA FLOWS USING A TCAM

(75) Inventors: Ashutosh Mate, Milpitas, CA (US); Atul Mahamuni, San Jose, CA (US); Vijay Chander, Santa Clara, CA (US)

(73) Assignee: Nokia, Inc., Irving, TX (US)

( * ) Notice: Subject to any disclaimer, the term of this patent is extended or adjusted under 35 U.S.C. 154(b) by 698 days.

(21) Appl. No.: 09/909,739

(22) Filed: Jul. 20, 2001

(65) Prior Publication Data

US 2003/0056001 A1 Mar. 20, 2003

(51) Int. Cl.
*G06F 15/173* (2006.01)

(52) U.S. Cl. .................. 709/238; 709/240; 709/241; 711/108

(58) Field of Classification Search ............. 709/238, 709/239–244; 711/108, 212, 151, 158
See application file for complete search history.

(56) References Cited

U.S. PATENT DOCUMENTS

| | | | | |
|---|---|---|---|---|
| 5,386,413 A * | 1/1995 | McAuley et al. | ............ | 370/392 |
| 5,684,954 A * | 11/1997 | Kaiserswerth et al. | ...... | 709/236 |
| 5,841,874 A * | 11/1998 | Kempke et al. | ............ | 713/160 |
| 5,991,300 A | 11/1999 | Tappan | | |
| 6,044,005 A | 3/2000 | Gibson et al. | | |
| 6,052,683 A | 4/2000 | Irwin | | |
| 6,055,561 A | 4/2000 | Feldman et al. | | |
| 6,061,712 A | 5/2000 | Tzeng | | |
| 6,081,440 A * | 6/2000 | Washburn et al. | ............ | 365/49 |
| 6,137,707 A * | 10/2000 | Srinivasan et al. | ........... | 365/49 |
| 6,154,384 A | 11/2000 | Nataraj et al. | | |
| 6,173,333 B1 * | 1/2001 | Jolitz et al. | ................. | 709/240 |
| 6,205,488 B1 | 3/2001 | Casey et al. | | |
| 6,237,061 B1 * | 5/2001 | Srinivasan et al. | ......... | 711/108 |
| 6,266,706 B1 * | 7/2001 | Brodnik et al. | ............. | 709/242 |
| 6,295,532 B1 * | 9/2001 | Hawkinson | .................... | 707/4 |
| 6,324,087 B1 * | 11/2001 | Pereira | ........................ | 365/49 |
| 6,502,163 B1 * | 12/2002 | Ramankutty | ................ | 711/108 |
| 6,516,383 B1 * | 2/2003 | Patra et al. | ................. | 711/108 |
| 6,594,704 B1 * | 7/2003 | Birenback et al. | .......... | 709/238 |
| 6,687,785 B1 * | 2/2004 | Pereira | ....................... | 711/108 |
| 6,763,425 B1 * | 7/2004 | Pereira | ....................... | 711/108 |
| 2002/0078040 A1 * | 6/2002 | Hawkinson | .................... | 707/4 |

* cited by examiner

*Primary Examiner*—Krisna Lim
*Assistant Examiner*—LaShanya Nash
(74) *Attorney, Agent, or Firm*—Squire, Sanders & Dempsey L.L.P.

(57) ABSTRACT

The present invention relates to a method and system for supporting in a router a plurality of data flows using a ternary content addressable memory (TCAM) in which the number of accesses to write to the TCAM is optimized to improve efficiency of updating and subsequent look up. To accommodate the plurality of data flows, the TCAM is partitioned into at least two partitions in which a first portion includes indices having a higher priority and a second portion includes indices having a lower priority. For example, multiple protocol label switching (MPLS) flows and IP-Virtual Private Network (VPN) can be added to the first partition and policy based routing flows can be added to the second partition. During subsequent TCAM look-up of a prefix of an incoming packet the MPLS or IP-VPN flow will subsume any matching policy based routing flow, such as flows classified by an access control list or traffic manager flows.

67 Claims, 8 Drawing Sheets

SELECTIVE ROUTING OF DATA FLOWS USING A TCAM

FIELD OF THE INVENTION

This invention relates to network communications and more particularly to selectively routing a plurality of data flows, such as, Multi-Protocol Label Switching ("MPLS"), Internet Protocol (IP) Virtual Private Network ("VPN") data packets and policy based routing data packets, using a ternary content addressable memory ("TCAM").

BACKGROUND OF THE INVENTION

Network providers are interested in providing centralized network services to meet customer demands. By taking advantage of the latest advances in IP quality of service ("QoS"), multiprotocol label switching ("MPLS"), and service transformation technology (the conversion of non-IP services to IP), service providers can evolve dedicated IP infrastructures into a multi-service network architecture, as an alternative to operating separate service-specific networks.

MPLS is a standards-approved technology for speeding up network traffic flow and making it easier to manage. MPLS involves setting up a specific path for a given sequence of packets, identified by a label put in each packet, thereby saving the time needed for a router to look up the address to the next node. MPLS is called multiprotocol because it works with the Internet Protocol ("IP"), Asynchronous Transport Mode ("ATM"), and various frame relay network protocols. MPLS allows most packets to be forwarded at the layer 2 (switching) level of the standard Open Systems Interconnection ("OSI") rather than at the layer 3 (routing) level. In addition to moving traffic faster overall, MPLS makes it easy to manage a network for quality of service ("QoS"). For these reasons, the technique is expected to be readily adopted as networks begin to carry more and different mixtures of traffic.

The essence of MPLS is the generation of a short fixed-length "label" that acts as a shorthand representation of an IP packet's header and the use of that label to make forwarding decisions about the packet. Typically, IP data packets are routed from source to destination through a series of routers which receive the IP data packet, read the source and/or destination addresses and re-transmit the IP data packet either to the destination indicated as indicated by the IP destination addressed contained in the IP data packet or to another router which will forward the IP data packet until the IP data packet reaches the destination address, referred to as hop by hop routing. IP packet headers have fields for IP source and/or destination addresses. Routing protocols such as Routing Information Protocol ("RIP") and Open Shortest Path First ("OSPF") enable each machine to understand which other machine in the "next hop" that a packet should take toward its destination.

In MPLS, the IP packets are encapsulated with labels by the first MPLS device they encounter as they enter the network. The MPLS edge router analyses the contents of the IP header and selects an appropriate label with which to encapsulate the packet. In contrast to conventional IP routing, the router analysis can be based on more than just the destination address carried in the IP header. At all the subsequent nodes within the network the MPLS label, and not the IP header, is used to make the forwarding decision for the packet. As MPLS labeled packets leave the network, another edge router removes the labels. In MPLS terminology, the packet handling nodes or routers are called Label Switched Routers (LSRs). MPLS routers forward packets by making switching decisions based on the MPLS label. There are two broad categories of LSR: MPLS edge routers, which are high performance packet classifiers that apply (and remove) the requisite label at the edge of the network; and Core LSRs which are capable of processing the labeled packets at extremely high bandwidths.

Traditional routing solutions for efficient use of IP addressing have included using a content addressable memory (CAM) device for storing IP addresses. A CAM is a storage device that can be instructed to compare a specific pattern of comparand data with data stored in its associative CAM array. The entire CAM array, or segments thereof, are searched in parallel for a match with the comparand data. If a match exists, the CAM device indicates the match by asserting a match flag. Multiple matches may also be indicated by asserting a multiple match flag. The CAM device typically includes a priority encoder to translate the highest priority matching location into a match address or CAM index. The generally fast parallel search capabilities of CAMs have proven useful in many applications including address filtering and lookups in routers and networking equipment, policy enforcement in policy-based routers, pattern recognition for encryption/decryption and compression/decompression applications, and other pattern recognition applications.

Binary CAM cells are able to store two states of information: a logic one state and a logic zero state. Binary CAM cells typically include a RAM cell and a compare circuit. The compare circuit compares the comparand data with data stored in the RAM cell and drives a match line to a predetermined state when there is a match. Columns of binary CAM cells may be globally masked by mask data stored in one or more global mask registers. Ternary CAM cells are mask-per-bit CAM cells that effectively store three states of information, namely: a logic one state, a logic zero state, and a don't care state for compare operations. Ternary CAM cells typically include a second RAM cell that stores local mask data for the each ternary CAM cell. The local mask data masks the comparison result of the comparand data with the data stored in the first RAM cell such that the comparison result does not affect the match line. The ternary CAM cell offers more flexibility to the user to determine on an entry-per-entry basis which bits in a word will be masked during a compare operation.

U.S. Pat. No. 6,237,061 describes a system in which Classless Inter-Domain Routing (CIDR) addresses are pre-sorted and loaded into the ternary CAM such that the CAM entry having the longest prefix is located at the highest numerical address or index. The prefix portions of the CIDR addresses are used to set the masks cells associated with each CAM entry such that during compare operations, only the unmasked prefix portion of each CAM entry, which may correspond to a network ID field, is compared to an incoming destination address stored as the CAM search key. Since each CAM entry is masked according to an associated prefix value, the ternary CAM requires only one search operation to locate the CAM entry having the longest matching prefix.

Some other network services which are offered by network providers include Internet Protocol (IP) Virtual Private Networks (VPN) to interconnect various customer sites that are geographically dispersed. VPNs offer privacy and cost efficiency through network infrastructure sharing. U.S. Pat. No. 6,205,488 describes a virtual private network including multiple routers connected to a shared MPLS network which are configured to dynamically distribute VPN information across the shared MPLS network.

Policy-based routing services have also been described to allow customers to implement policies that selectively cause packets to take different paths. Conventional applications of policy based routing have included: source based transit provider selection for routing traffic originating from different sets of users through different Internet connections across the policy routers; quality of service (QOS) for prioritizing traffic based on the type of service; and cost savings for distributing traffic between low-bandwidth, low cost permanent paths and high-bandwidth, high cost, switched paths.

It is desirable to provide a method and system having fast search capabilities through use of a TCAM for classifying a plurality of types of data traffic and route lookup.

SUMMARY OF THE INVENTION

The present invention relates to a method and system for supporting a plurality of data flows in a router using a ternary content addressable memory (TCAM) in which the number of accesses to the TCAM is optimized to improve efficiency of updating and subsequent look up. To accommodate the plurality of data flows, the TCAM is partitioned into at least two partitions in which a first portion includes indices having a higher priority and a second portion includes indices having a lower priority. For example, multiple protocol label switching (MPLS) flows and IP-Virtual Private Network (VPN) can be added to the first partition and policy based routing flows can be added to the second partition. During subsequent TCAM look-up of a predetermined prefix of an incoming packet the MPLS or IP-VPN flow will subsume any matching policy based routing flow, such as flows classified by an access control list or traffic manager flows.

In the case of MPLS and IP-VPN flows, flows classified by connection index (CIX) and destination IP address (DA) and flows classified by CIX only are added from the top of the first partition of the TCAM and flows classified by DA only are added from the bottom of the first partition. This arrangement has the advantage that CIX and DA flows and CIX only flows subsume DA only flows at higher indices and CIX and DA flows and CIX only flows are separated from DA only flows to optimize the number of swaps needed when adding a new flow. To reduce the number of writes to the TCAM, a flow index space is used having entries corresponding to the TCAM space. Swaps are performed in the index space and only the changed entries are written to the TCAM.

The invention will be more fully described by reference to the following drawings.

DETAILED DESCRIPTION

Reference will now be made in greater detail to a preferred embodiment of the invention, an example of which is illustrated in the accompanying drawings. Wherever possible, the same reference numerals will be used throughout the drawings and the description to refer to the same or like parts.

Figure 1:
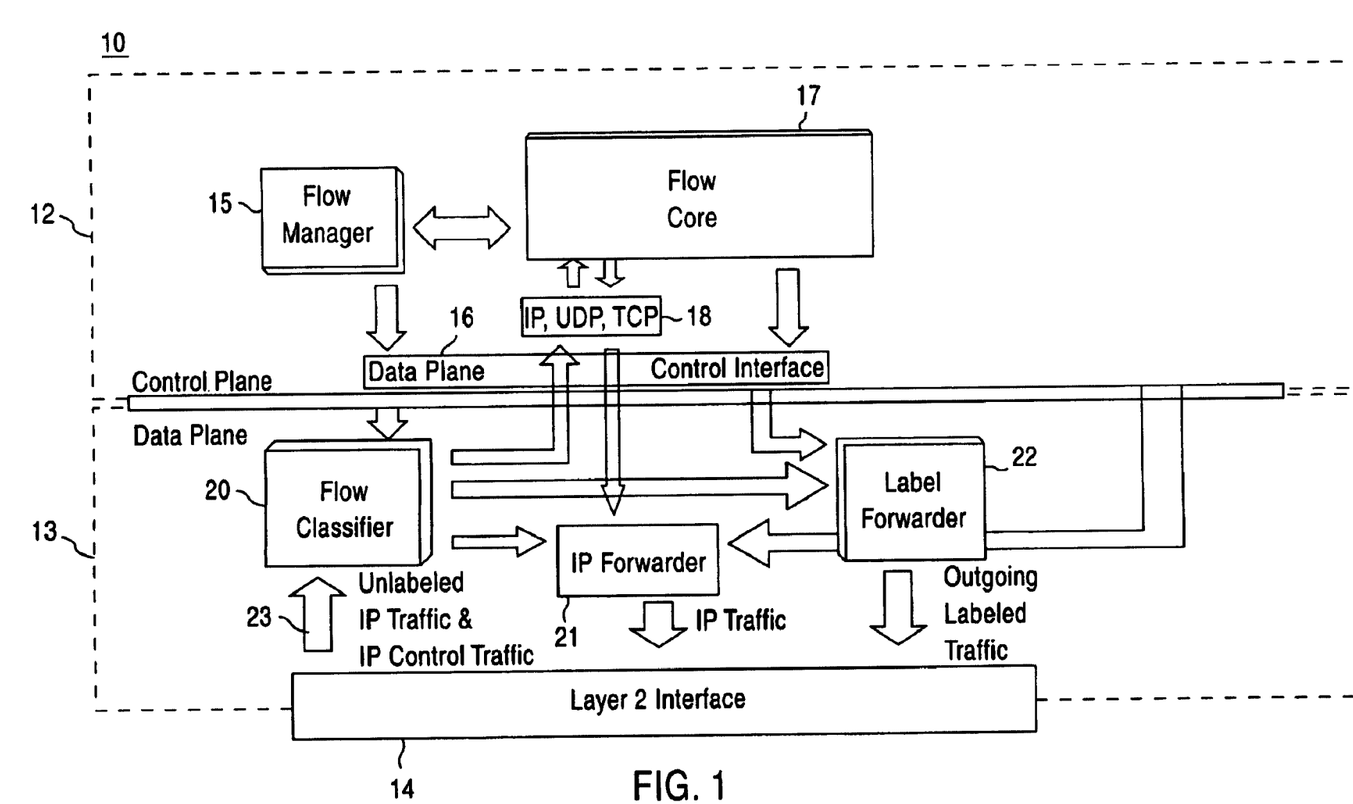
FIG. 1 is a high-level functional block diagram of a system architecture for classifying flows in a router in accordance with the teachings of the present invention.

Referring to FIG. 1 there is shown a high-level functional block diagram of the system architecture for classifying and routing flows in a router 10 in accordance with the teachings of the present invention. A flow is a set of data packets that obey a rule or policy identified from the content of the packet header fields of the data packets. The packet header fields can include for example the source IP address, destination IP address, source port, destination port, protocol identification, type of service (TOS), connection index (CIX) and other fields. The architecture comprises three major elements, control plane 12, data plane 13 and layer 2 interface 14. The interaction between the various elements is represented by the series of arrows between corresponding elements. Control plane 12 which can be implemented in software is comprised of flow manager 15, data plane control interface 16, flow core control 17 and IP, User Datagram Protocol ("UDP") and Transmission Control Protocol ("TCP") 18. Data plane 13 which can be implemented in hardware is comprised of flow classifier 20, IP forwarder 21 and label forwarder 22. IP traffic and IP control traffic 23 is received at flow classifier 20. Flow classifier 20 interacts with flow manager 15 and flow core control 17 for classifying and routing IP traffic and IP control traffic 23 and applying destination routes through label forwarder 22, in the case of MPLS flows, or IP forwarder 21 in the case of non-MPLS flows. Flow core control 17 can comprise software modules such as, for example, TEP, red manager, label manager, route watch, routing manager and FIB and an IP routing data base. While the present invention is particularly well suited for use with the AmberNetwork ASR 2000 and ASR 2020 devices as described herein, it is equally suited for use with other routers having similar capabilities and features. The AmberNetwork ASR 2000 and ASR 2020 technical manuals are incorporated herein by reference as if fully set out.

Figure 2:
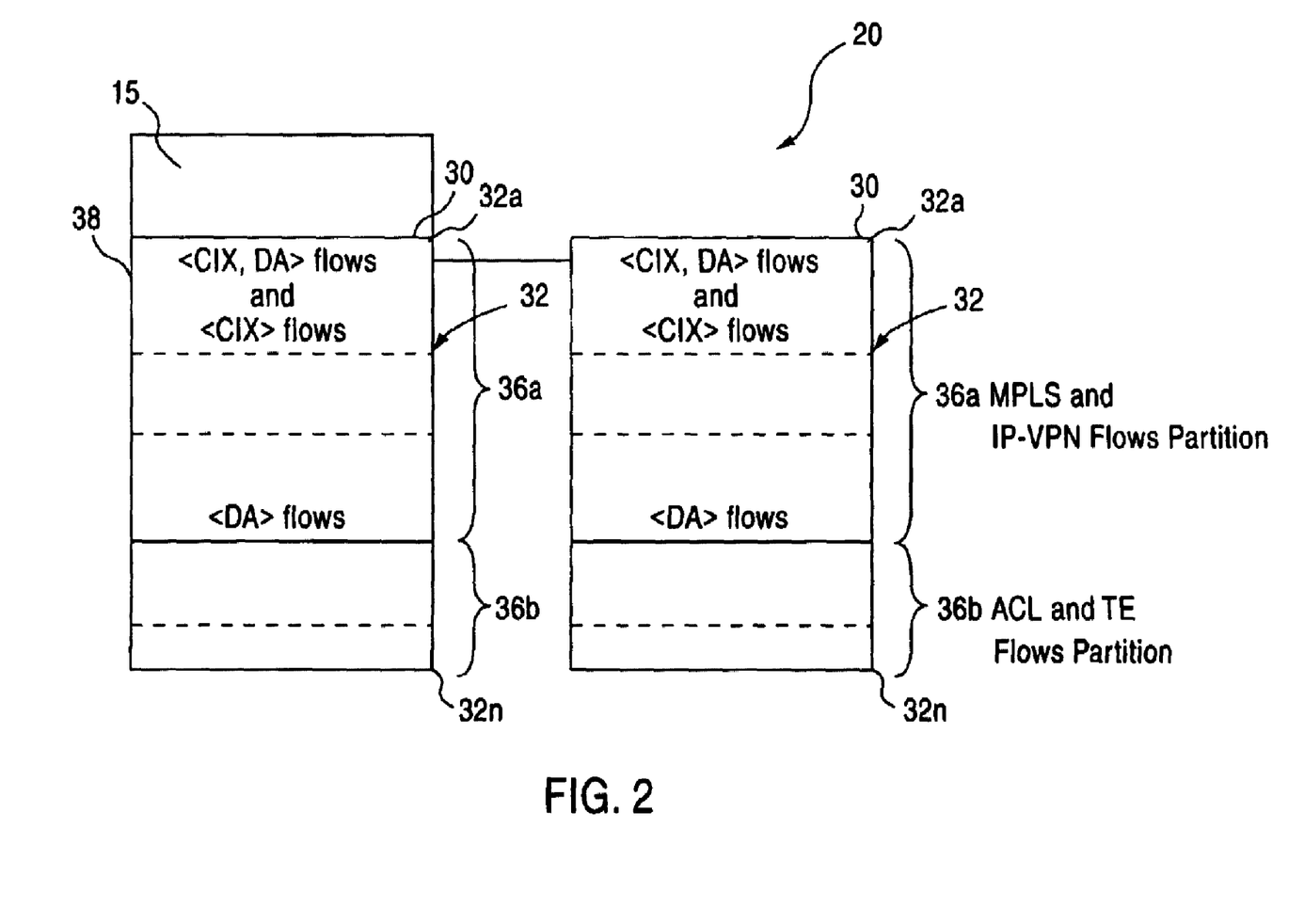
FIG. 2 is a schematic diagram of implementation of a flow classifier and flow manager.

FIG. 2 is a schematic diagram of an example implementation of flow classifier 20 and flow manager 15. In this embodiment, flow classifier 20 comprises flow ternary content addressable memory (TCAM) 30. Flow TCAM 30 is a hardware memory device where all entries in the TCAM are compared in parallel against incoming packet header fields and the first matching entry is selected in a single clock cycle. A suitable TCAM is manufactured by Lara Technology Inc., San Jose, Calif. and as described in U.S. Pat. No. 6,081,440 hereby incorporated by reference into this application. Each flow TCAM 30 entry is addressed or indexed by indices 32. Indices 32 can be an index or numerical address. Indices 32 are arranged from lowest index 32a to highest index 32n with priority being greatest at lowest index 32a and being least at highest index 32n.

Figure 3:
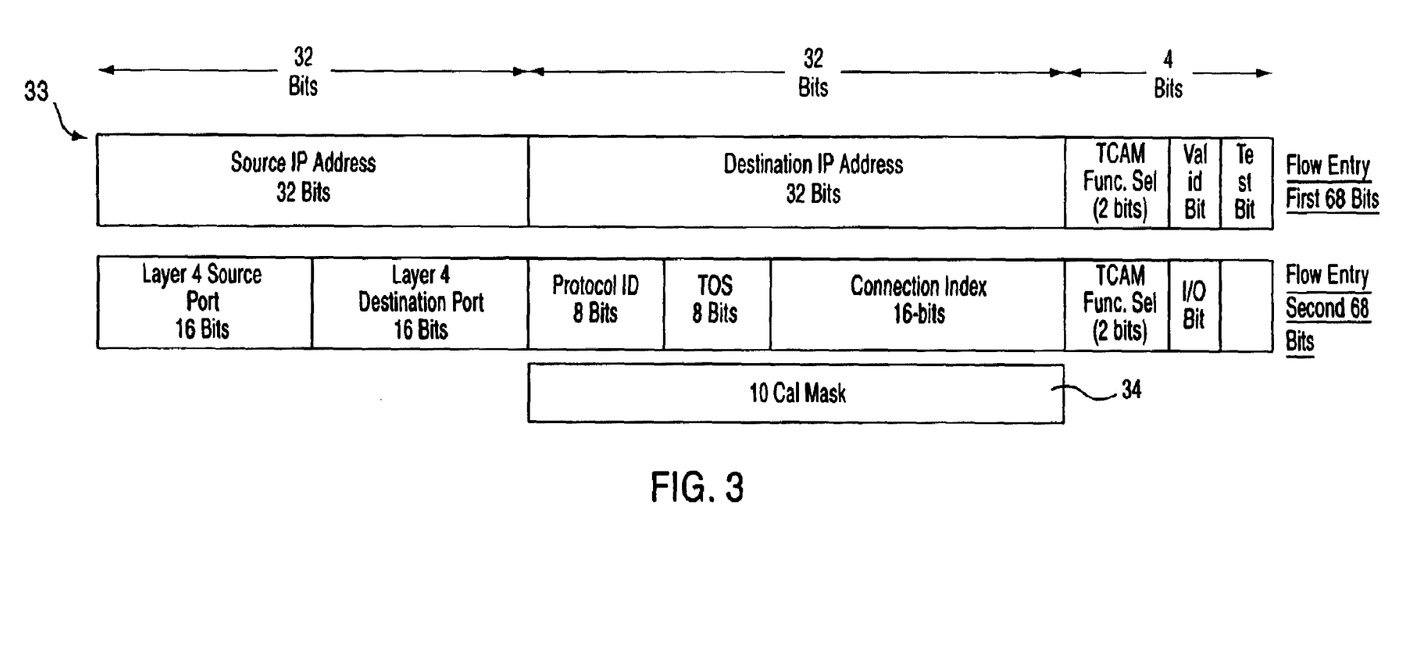
FIG. 3 is a schematic diagram of a TCAM flow entry.

FIG. 3 illustrates a representative TCAM flow entry 33 to be stored in flow TCAM 30. A local mask 34 is associated with each TCAM flow entry 33 for effectively storing in flow TCAM 30 either a logic 0, a logic 1, or a don't care for a flow TCAM look up operation. For example, if a bit of local mask 34 is a logic 1, the corresponding bit of TCAM flow entry 33 is compared to a corresponding bit of an incoming data packet during a subsequent flow TCAM look up operation. Conversely, if local mask 34 is a logic 0, the corresponding bit of TCAM flow entry 33 is not compared during a subsequent flow TCAM look up operation. Alternatively, in other embodiments of the present invention the mask bit scheme can be inverted such that a mask bit is equal to logic 1, the corresponding bit of the TCAM flow entry is masked and if a mask bit is equal to a logic 0 the corresponding bit of the TCAM flow entry is compared. A prefix can be associated with one or more of the fields in flow TCAM entry 33, such as the destination IP address, to indicate the number of bits of the destination IP address of the packet header to be matched in flow TCAM 30. In a subsequent flow TCAM look up operation, if there is a match between the unmasked flow TCAM entry and the predetermined prefix corresponding to the incoming packet header bits, the index of the matching TCAM flow entry 33 as well as any routing data stored in flow TCAM 30 or in an associated external memory such as for instance, an SRAM, is provided as output.

Flow manager 15 is used to provide data structure organization of flow TCAM 30. Referring to FIG. 2, flow manager 15 can partition indices 32 into one or more logical partitions. Flows are assigned to partitions depending on a desired priority for the type of flow. In this embodiment, indices 32 are partitioned into partition 36a which partition includes lowest index 32a and partition 36b which partition includes highest index 32n. A FTCAM_Partition index is located between partition 36a and partition 36b. In the embodiment shown in FIG. 2, MPLS and IP-VPN flows are determined to have the highest priority and are assigned to partition 36a. Policy-based routing flows are determined to have lower priority and are assigned to partition 36b. Policy based routing flows can include data classified by Access Control Lists (ACL) flows and traffic manager (TE) flows. Accordingly, MPLS flows and IP-VPN flows which have been assigned higher priority will be found in a subsequent lookup in flow TCAM 30 before ACL flows and TE flows which have been assigned a lower priority and MPLS flows or P VPN flows will subsume any matching ACL flows and TE flows in flow TCAM 30.

Flow index space 38 can be maintained in flow manager 15 to correspond to data organization of flow TCAM 30. All flow swapping can be performed in flow index space 38 and only the changed entries are written to the flow TCAM 30.

Figure 4A:
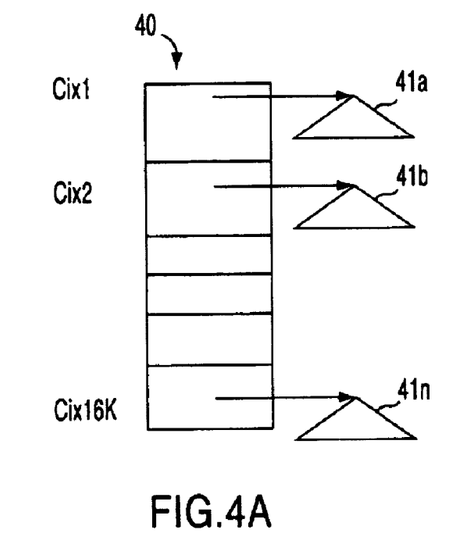
FIG. 4A is a schematic diagram of a prefix tree for storing flows classified by a connection index (CIX).
Figure 4B:
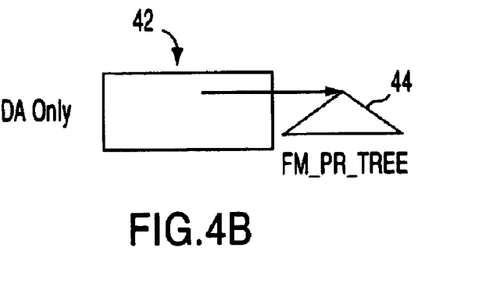
FIG. 4B is a schematic diagram of a prefix tree for storing flows classified by a destination address (DA).

In an embodiment of the present invention, an array of pointers and prefix trees are used to store MPLS and IP-VPN flows in flow index space 38, as shown in FIGS. 4A and 4B. Flows which are classified by connection index CIX and destination IP address (DA) fields of the packet header, are stored in CIX prefix tree 40. Each connection index (CIX1–CIX16K) is associated with node 41a–41n of prefix tree 40. A destination IP address based lookup is performed to find the longest match of a prefix stored in a respective node 41a–41n. Flows are maintained in order to match the correct flow during flow TCAM 30 look up. A variable gMaxCixDaFix is used in flow index space 38 to indicate the maximum flow TCAM Index of the CIX and DA flows and CIX only flows. Flows which are classified by destination IP address only are stored in DA prefix tree 42. Each DA is associated with node 44 of prefix tree 42.

A variable gMinDaOnlyFix is used in flow index space 38 to indicate the minimum flow TCAM index for DA only flows A software module can be implemented in flow manager 15 for MPLS and IP-VPN flow organization of TCAM 30. A representative software module is illustrated in Table 1.

TABLE 1

```
typedef struct _flowlkuptabentry
{
    FM_PR_TREE *pfTreePtr;
} FM_FLOWLKUP_TABLE_ENTRY;
typedef struct _lookuptable
{
    FM_FLOWLKUP_TABLE_ENTRY
    flowLkupTable[FM_MAX_CIX];
}FM_FLOWLKUP_TABLE;
typedef struct _fmprtreenode
{
    PR_NODE    prNode;     /* PR_NODE contains
RB_NODE + prefix and mask */
    FM_FLOW    flowObject;
}FM_PR_NODE;
typedef struct _fmprefixtree
{
    PR_TREE    prTree; /* root of prefix tree */
} FM_PR_TREE;
```

FIGS. 5A–5D illustrate an example of data organization of flow TCAM 30 for MPLS and IP-VPN flows. Flows are maintained in order to match the correct flow during flow TCAM 30 look up. Partition 36a is divided into lower index portion 50a and higher index portion 50b. Lower index portion 50a corresponds to a lower index or address range and higher index portion 50b corresponds to a higher index or address range. Flows which are to be classified by the connection index (CIX) and Destination IP Address (DA) fields of the packet header, referred to as CIX, DA, are assigned to lower index portion 50a. Flows which are classified only by the CIX of the packet header are also assigned to lower index portion 50a. Flows which are classified only by the DA of the packet header are assigned to higher index portion 50b. Local mask 34 can be applied to each flow TCAM entry 33 to effectively store the particular type of data flows, such as the above-described CIX, DA flows, CIX only flows and DA only flows, for use in compare operations of flow TCAM 30. For example, CIX only flows can occur when local mask bits of the DA are zero and local mask bits of the CIX are all one.

During adding of flows classified by CIX, DA or CIX only to TCAM 30, a free entry in TCAM 30 is searched from lowest index 32a of lower index portion 50a. The free entry is referred to as Fix. During adding of flows classified as DA flows, a free entry in TCAM 30 is searched from highest index 32b of highest index portion 50b. An index corresponding to a maximum value of lowest index portion 50a is established as gMaxCixDaFix and an index corresponding to minimum value of a highest index portion 50b is established as gMinDaOnlyFix. In this manner, maximum free space 54 is achieved between lower index portion 50a and higher index portion 50b, thereby maintaining the CIX, DA flows and CIX only flows together and the DA only flows together and separately the CIX, DA flows and CIX only flows from the DA flows. During deletion of flows classified by CIX, DA or CIX only from TCAM 30, the entry at a corresponding index 32 is invalidated in flow space 38. Thereafter, during subsequent adding of flows classified by CIX, DA or CIX only, the invalidated entry is found during a search for free entries from lowest index 32a of lower index portion 50a the flow is added to re-use the previously invalidated entry. Accordingly, only if TCAM 30 is substantially at capacity will it be necessary to swap a DA only flow to insert a CIX, DA or CIX only flow or to swap a CIX, DA flow or CIX only flow to insert a DA only flow.

Figure 5A:
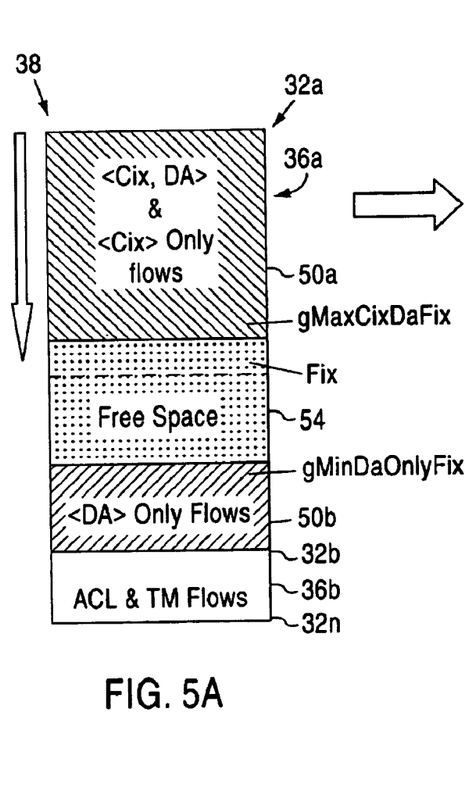
FIG. 5A is a schematic diagram of data organization of a flow TCAM for MPLS and IP-VPN flows classified by CIX and DA before addition of the flow when no DA flow is present.
Figure 5B:
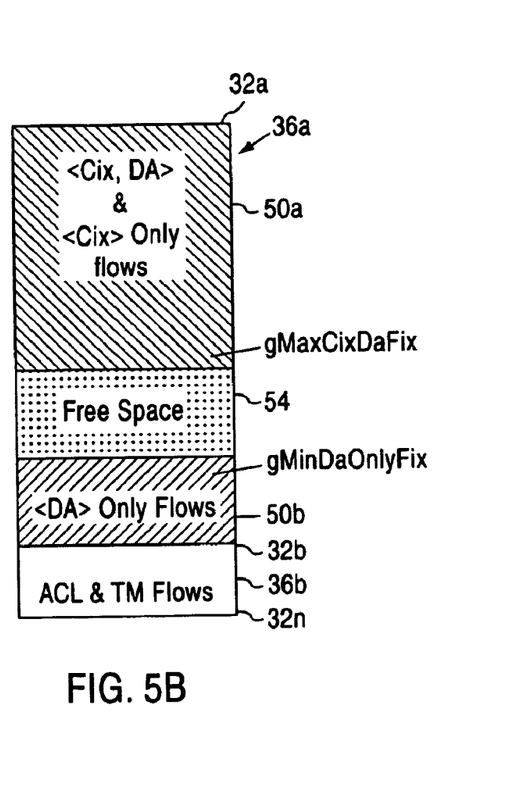
FIG. 5B is a schematic diagram of data organization of a flow TCAM for MPLS and IP-VPN flows classified by CIX and DA after addition of the flow when no DA flow is present.
Figure 5C:
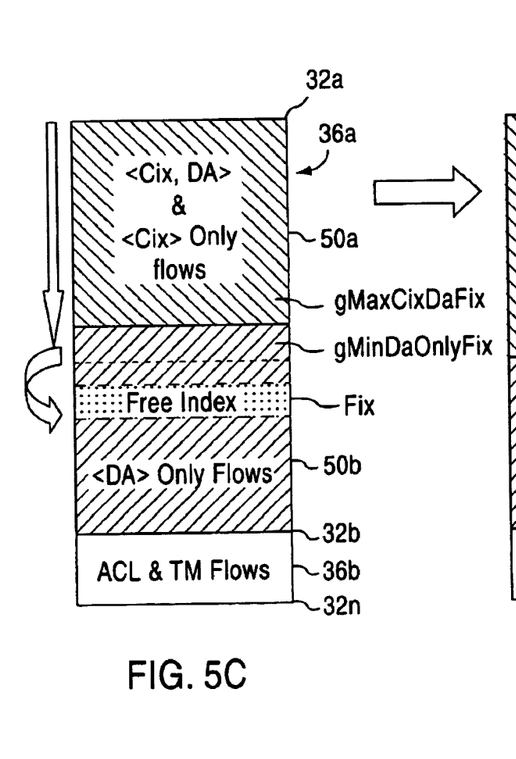
FIG. 5C is a schematic diagram of data organization of a flow TCAM for MPLS and IP-VPN flows classified by CIX and DA before addition of the flow when DA flow is present.
Figure 5D:
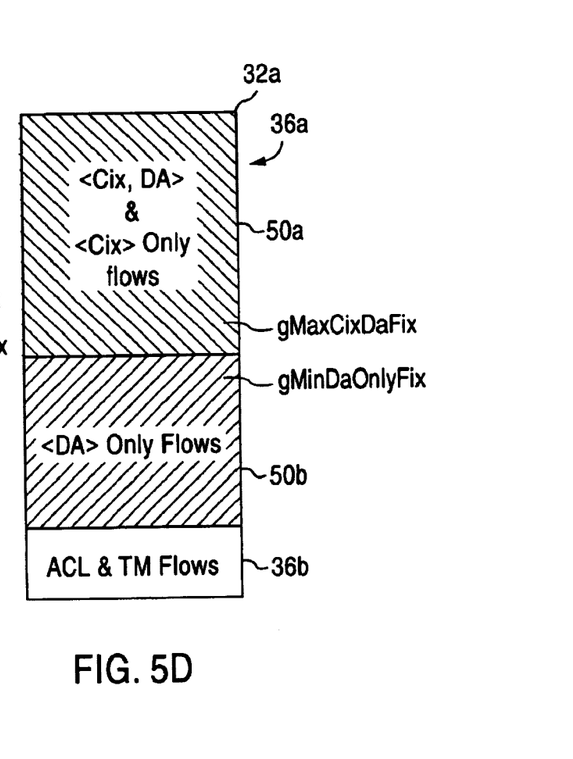
FIG. 5D is a schematic diagram of data organization of a flow TCAM for MPLS and IP-VPN flows classified by CIX and DA after addition of the flow when DA flow is present.

FIGS. 5A–5B illustrate assignment of CIX, DA flows and CIX only flows if no DA only flows exist or a free TCAM entry, Fix, is above the DA only flows at a lower index value than gMinDaOnlyFix. The gMaxCixDaFix index entry is set immediately after the index corresponding to Fix. FIGS. 5C–5D illustrate assignment of CIX, DA and CIX only flows if there are DA only flows present or a free TCAM entry, Fix, is between the DA only flows. In this embodiment, TCAM 30 is almost full. There exists no free entries from lowest index 32a past gMaxCixDaFix and gMinDaOnlyFix indices. Accordingly, the gMaxCixDaFix and gMinDaOnlyFix indices are adjacent indices. A free entry is available between the index of gMinDaOnlyFix and highest index 32b. For example, the free entry can occur in the Da flow space because of an earlier deletion of a DA flow. In order to use the free entry, Fix, for a flow classified by CIX, DA or CIX only, the DA flow at the gMinDaOnlyFix index is moved into Fix, thereby making the gMinDaOnly Fix index available. The flow classified by CIX, DA or CIX only is written at the current index for gMinDaOnlyFix. The gMaxCixDa-Fix index is set at the written TCAM entry for the flow classified by CIX, DA or CIX only and the gMinDaOnlyFix entry is set immediately after the written TCAM entry. The other CIX, DA and CIX only flows between lowest index 32a and the gMaxCixDaOnlyFix index in TCAM 30 are adjusted for proper subsuming ordering. The other DA only flows between the gMinDaOnlyFix index and highest index 32b are adjusted for proper subsuming ordering.

A software module can be implemented in flow manager 15 for adding CIX, DA flows and CIX only flows to TCAM 30. A pointer to the current flow is referred to as pflow. A pointer to the free entry is referred to as fix. The TCAM flow entry 33 is written to flow TCAM 30 by an AdjustAndWriteCixDA(pflow, fix) function, described below in order to adjust the writing at TCAM flow entry 33 into flow TCAM 30 based on local mask 34 of other DAs in the same CIX. A representative software module is illustrated in Table 2.

TABLE 2

1. Begin insertCixDaFlow (pFlow)
2. Starting at top of TCAM partition, searching downwards, find first free FTCAM entry, say 'Fix'.
3. if ((gMinDaOnlyFix == 0) ‖ (Fix < gMinDaOnlyFix))
   {  /* No <DA> only flows are present */
      /* Or <DA> only flows exist, but Fix is above them */
      AdjustAndWriteCixDA (pFlow, Fix) /* take care of subsuming issues with other DAs in same Cix, based on subnet masks */
      Set gMaxCixDaFix
      return
   }
   else
   {
      /* There are DA Only flows present */
      /* Free flow is in between the <DA> only flows */
      /* Get Flow currently at gMinDaOnlyFix */
      pOtherFlow = GetFlowAtIndex (gMinDaOnlyFlow);
      AdjustAndWriteDA (pOtherFlow, Fix);
      /* Write Flow to be added at gMinDaOnlyFix */
      AdjustAndWriteCixDA (pFlow, gMinDaOnlyFix);
      set gMaxCixDaFix
      set gMinDaOnlyFix
      Return
   }
4. End of insertCixDaFlow During inserting of CIX, DA flows, CIX only flow and DA only flows the flows in flow TCAM 30 are adjusted such that flow TCAM 30 is ordered to have the TCAM entry with the longest prefix located at the index having highest priority which is the lowest index or lowest numerical value and the TCAM entry followed by decreasing prefix values with the shortest prefix is located at the index having lowest priority which is the highest index or highest numerical value. Tables 3 and 4 illustrate respective software modules which can be implemented in flow manager 15 for adjusting and writing DA only flows and adjusting and writing Fix and DA flows and which modules are used in the software module illustrated in Table 1.

TABLE 3

1. Begin AdjustAndWriteDA(pFlow).
2. Using the mask length of the destination IP address in the flow, first fix the shorter-prefix flow in prefix tree 42. If a shorter prefix node is found in the <DA> only prefix tree 42, and the index of the found node is less than the index of the pFlow node, swap the two flows and write only the second flow to flow TCAM 30. Then continue search with the removed flow to locate routes that are subsumed.
3. Write the last best flow into its correct location and remember this so that it doesn't have to be re-written again below.
4. At this point pFlow is pointing to the shortest-prefix flow whose index had to be adjusted to follow a largest prefix match (LPM) property and that matched the original flow that had to be inserted in flow TCAM 30.
5. Fix the longer-prefix flows in TCAM 30. Starting from mask length 32 and going downwards to current mask length, find largest flow index flow that gets subsumed.
6. If the found flows flow index is greater than the index of current flow, it means that a flow with a longer prefix to the same destination is before the current one which has a shorter prefix. In this case swap the two flows in TCAM 30 and fix the index values in the flows. Write the second flow to TCAM 30.
7. Write the last best flow into its correct location. If this is same flow as that already written in step 3 above, TCAM 30 is not written again.
8. End of AdjustAndWriteDA(pFlow).

TABLE 4

1. Begin adjustAndWriteCixDA (pFlow, Fix)
2. Using the mask length of the destination IP address in the flow, first fix the shorter-prefix flow in prefix tree 40. If a shorter prefix node is found and the index of the found node is less than the index of the pFlow node, swap the two flows and write only the second flow to flow TCAM 30. Then continue search with the removed flow to locate routes that are subsumed.
3. Write the last best flow into its correct location and remember this so that it doesn't have to be re-written again below.
4. At this point pFlow is pointing to the shortest-prefix flow whose index had to be adjusted to follow LPM property and that matched the original flow that had to be inserted in flow TCAM 30.
5. Fix the longer-prefix flows in TCAM 30. Starting from mask length 32 and going downwards to current mask length, find largest flow index flow that gets subsumed.
6. If the found flows flow index is greater than the index of current flow, it means that a flow with a longer prefix to the same destination is before the current one which has a shorter prefix. In this case swap the two flows in the TCAM 30 and fix the index values in the flows. Write the second flow to TCAM 30.
7. Write the last best flow into its correct location. If this is same flow as that already written in step 3 above, TCAM 30 is not written again.
8. End of AdjustAndWriteCIXDA(pFlow, Fix).

Figure 6A:
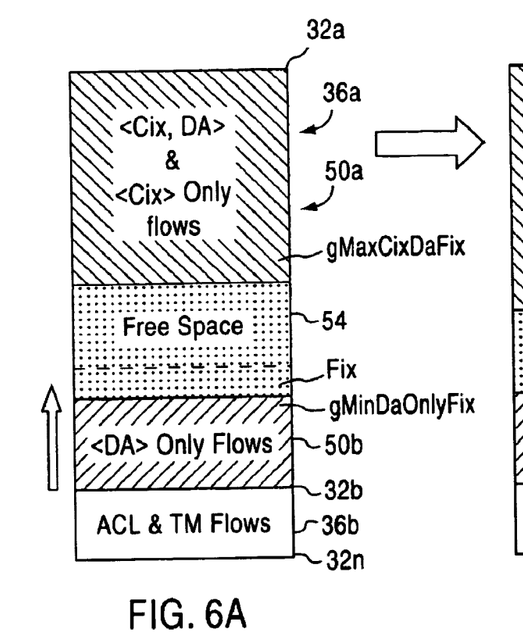
FIG. 6A is a schematic diagram of data organization of a flow TCAM for MPLS and IP-VPN flows classified by DA before addition of the flow when no CIX, DA or CIX flows are present.
Figure 6B:
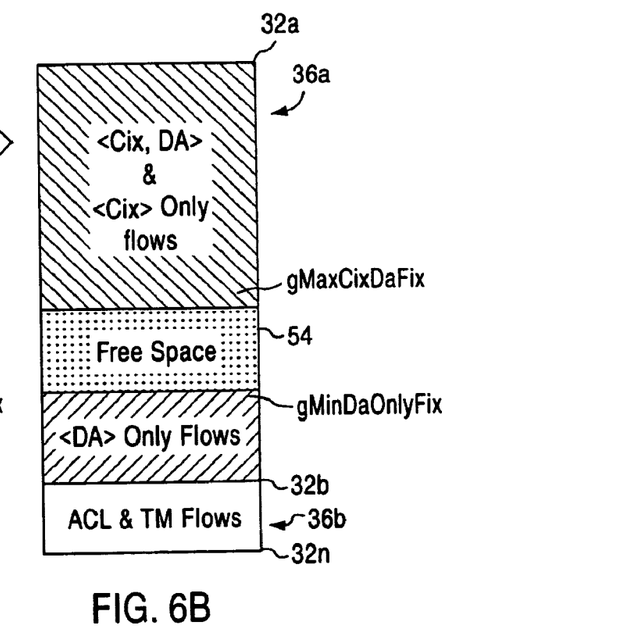
FIG. 6B is a schematic diagram of data organization of a flow TCAM for MPLS and IP-VPN flows classified by DA after addition of the flow when no CIX, DA or CIX flows are present.
Figures 6C, 6D:
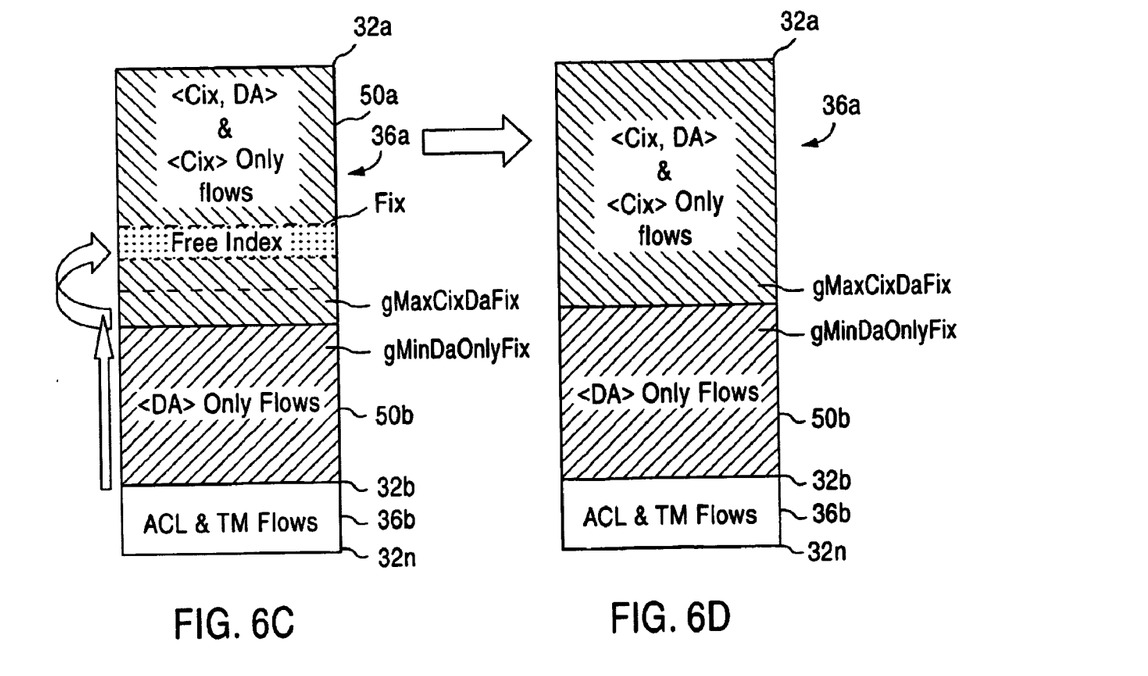
FIG. 6C is a schematic diagram of data organization of a flow TCAM for MPLS and IP-VPN flows classified by DA before addition of the flow when CIX, DA or CIX flows are present.
FIG. 6D is a schematic diagram of data organization of a flow TCAM for MPLS and IP-VPN flows classified by DA after addition of the flow when CIX, DA or CIX flows are present.

FIGS. 6A–6B illustrate assignment of DA only flows if the first free TCAM entry, Fix, is located after both CIX, DA flows and CIX only flows or if there are no CIX, DA flows. The gMinDaOnlyFix index entry is set at the index corresponding to Fix. FIGS. 6C–6D illustrate assignment of DA flows if the first free TCAM entry, Fix, is between CIX, DA or CIX only flows. In this embodiment, TCAM 30 is almost full. There exists no free entries from highest index 32b past gMinDaOnlyFix and gMaxCixDaFix. Accordingly, the gMaxCixDaFix and gMinDaOnlyFix indices are adjacent indices. A free entry is available between the index of gMaxCixDaFix and lowest index 32a. For example, the free entry can occur in CIX, DA and CIX only flow space because of an earlier deletion of a CIX, DA or CIX only flow. In order to use the free entry, Fix, for a flow classified by DA only, the CIX, DA or CIX only flow at the gMaxCixDaFix index is moved into Fix, thereby making the gMaxCixDaFix index available. The flow classified by DA is written at the current index for gMaxCixDaFix. The gMinDaOnlyFix entry is set at the written TCAM entry and the gMaxCixDaFix entry is set immediately before the written TCAM entry. The other DA flows between highest index 32b and the gMinDaOnlyFix index are adjusted for proper subsuming ordering. The other CIX, DA and CIX only flows between gMaxCixDaFix and lowest index 32a are adjusted for proper subsuming ordering.

A software module can be implemented in flow manager 15 for adding DA flows to TCAM 30. A representative software module is illustrated in Table 5.

TABLE 5

1. Begin insertDaOnlyFlow(pFlow).
2. Starting at the bottom of the TCAM partition, searching upwards, find the first free FTCAM entry, say at index 'Fix'.
   If failed (TCAM partition is already full), return −1.
3. if (Fix > gMaxCixDaFix)
   {   /* Flow index is located after both <Cix, DA> and <Cix> only flows in the TCAM*/
       /* OR gMaxCixDaFix = 0, i.e. there are no <Cix, DA> flows yet */
       AdjustAndWriteCixDA (pFlow, Fix) /* take care of subsuming issues with other DAs in same Cix, based on subnet masks */
       Set gMaxCixDaFix
       return
   }

TABLE 5-continued else
   {
       /*Fix lies in between <Cix, Da> flows*/
       /*Get flow currently at gMaxCixDaFix at flowIndex */
       pOtherFlow = GetFlowAtIndex(gMaxCixDaFix);
       AdjustAndWriteCixDA (pOtherFlow, Fix) /*take care of subsuming issues with other DAs in same Cix, based on subnet masks */
       /*Write flow to be added at gMaxCixDaFix */
       AdjustAndWriteDA (pFlow, gMaxCixOnlyFix)
       Set gMinDaOnlyFix
       Set gMaxCixDaFix
       Return
   }
4. End of insertDaOnlyFlow The clients of flow manager 15 are responsible for removing flows in TCAM 30 if an interface goes down. Flow manager 15 provides an Application Programming Interface (APIs) to withdraw routes based on the application handle. For example, if an IP circuit goes down the connection manager informs the IP task and the VPN manager receives this alarm. The VPN manager in turn withdraws the routes from flow TCAM 30 based on the circuit identifiers.

A software module can be implemented in flow manager 15 for removing flows in TCAM 30. A representative software module is illustrated in Table 6.

TABLE 6

1. Check that the flowId is within limits.
2. Get Flow corresponding to flowId: pFlow = GetFlowAtIndex(flowId)
3. Find the node in the correct tree. If pFlow has Cix, search prefix tree 40 for this Cix, else search prefix tree 42.
4. Remove found node, adjust respective tree and free up the node memory.
5. Free up Flow Space index entry.
6. if flowId == gMaxCixDaFix or gMinDaOnlyFix, modify these variables. If flow at gMaxCixDaFix index is being removed, reduce gMaxCixDaFix until it becomes the index of a valid <Cix,DA> or <Cix> only flow. If flow at gMinDaOnlyFixindex is being removed, increase gMinDaOnlyFix until it becomes the index of a valid <DA> only flow.
7. Free up the flow memory and invalidate the flow in TCAM 30.

Figure 7:
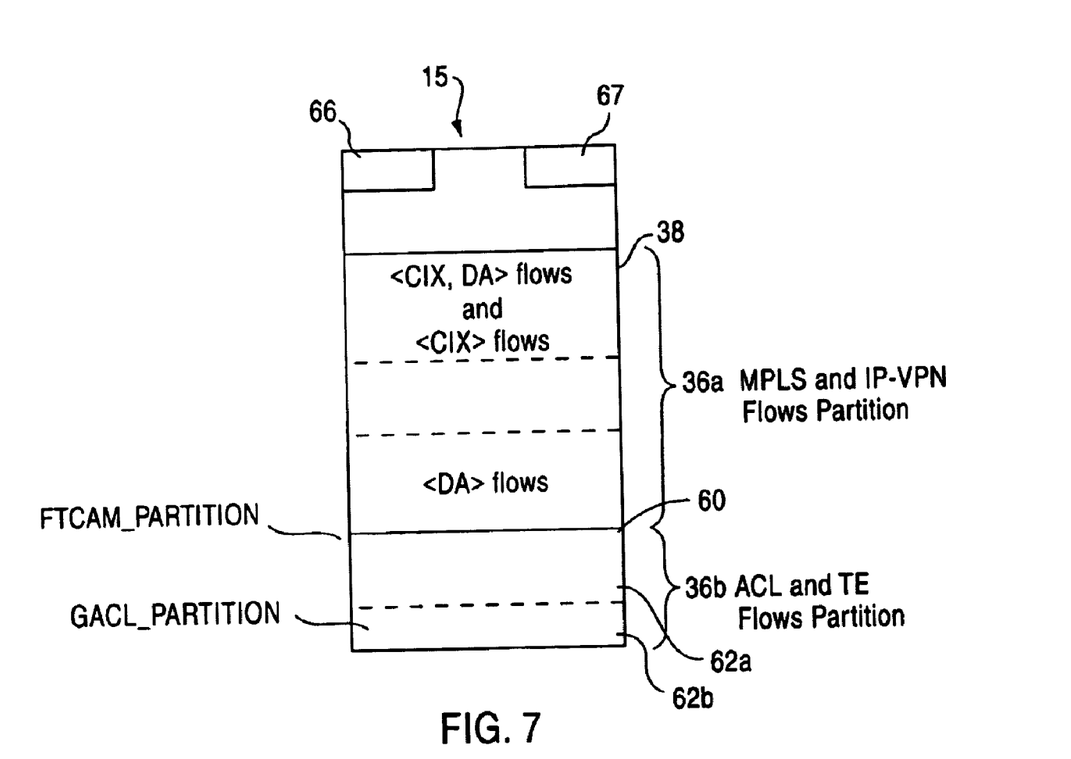
FIG. 7 is a schematic diagram of data organization of a flow TCAM for policy based routing flows.

ACL flows and traffic manager (TE) flows are internally stored in a flow index space corresponding to the Flow TCAM by the Flow Manager 15, as shown in FIG. 7. The ACL flows and TE flows are strictly ordered based on the command line interface (CLI) defined access control lists (ACLs). ACLs are typically applied to network interfaces to permit or deny certain kinds of network traffic. All packets matching a particular ACL flow will be allowed to pass through and a network route is determined. All packets not matching the ACL flow will be dropped or a policing or shaping of type of service ("TOS") operation will be performed on the packets. A global access-list is used at all interfaces.

The ACL and TE flows are maintained in order when added to flow TCAM 30. Flows are added to the next available index entry located in flow TCAM 30 starting from top 60 of partition 36b. Partition 36b is further subdivided into portions 62a and 62b. Portion 62a is used for ACLs applied to interfaces and portion 62b is used for global ACLs which will be used if no other ACL matches. A GACL_PARTITION variable can be used to define the partition size of portion 62a and 62b. A gMaxACLFix variable defines a maximum flow TCAM index for ACL and TE flows in portion 62a. A gGlobalACLFix variable defines a maximum flow TCAM index for Global ACL & TE flows in portion 62b.

Policy based ACL and TE flows are added at the location of the gMaxACLFix variable and the gMaxACLFix variable is incremented. If gMaxACLFix becomes equal to the GACL_PARTITION variable, portion 62b is full and no more ACL flows can be added until some flows are deleted. An ACL flow can specify a range of source or destination ports. The ACL flow that specifies a range of source or destination ports is mapped to multiple flows, with a local mask 34 to cover a portion of the range. Accordingly, the optimal number of flows with different masks are determined to cover the specified range. For the flows which map to multiple flows in the TCAM, an application programming interface (API) can create peer flows with an assigned local mask 34 and add the peer flows along with the parent flow to flow TCAM 30 which flows can be managed by flow manager 15.

Global ACL flows are added at gGlobalACLFix variable and then the gGlobalACLFix variable is incremented. If the gGlobalACLFix variable becomes equal to a FM_MAX_FIX variable, then no more Global ACL flows can be added until some flows are deleted from TCAM 30.

Flow manager 15 includes software modules which are responsible for removing flows from TCAM 30. For single flow deletion, the flow will be removed from flow index space 38 and is invalidated in flow TCAM 30. First API 66 is used to delete a single flow from TCAM 30. If the single flow has peer flows all of the peers will also be deleted. Flows remaining in flow TCAM 30 are compacted immediately in order to fill up the vacant flow space. All flows after the deleted flow are moved up by one index and are written to TCAM 30. The value of the gMaxACLFix variable is adjusted accordingly.

For multiple flow deletion, all flows in the supplied flow list will be removed and then compaction will be performed on remaining flows. A second API 67 is used to delete a list of flows for deleting multiple flows from TCAM 30. The first empty flow space is filled first by the next available occupied flow and this is repeated until all flows are compacted such that all empty flow spaces before the gMaxACLFix variable are filled up. The value of the gMaxACLFix variable is adjusted accordingly.

In view of the foregoing description, numerous modifications and alternative embodiments of the invention will be apparent to those skilled in the art. It should be clearly understood that the particular exemplary computer code can be implemented in a variety of ways in a variety of languages, which are equally well suited for a variety of hardware platforms.

It is to be understood that the above-described embodiments are illustrative of only a few of the many possible specific embodiments which can represent applications of the principles of the invention. Numerous and varied other arrangements can be readily devised in accordance with these principles by those skilled in the art without departing from the spirit and scope of the invention.

What is claimed is:

1. A method for classifying a plurality of data flows in a router comprising the steps of:

partitioning a ternary content addressable memory (TCAM) into at least a first partition and a second partition; said first partition includes indices having highest priority ranging from a lowest index to a partition index and said second partition includes indices having lowest priority ranging from a highest index to said partition index;

loading one or more first flow TCAM entries of a first of said plurality of data flows into said first partition in a predetermined order;

loading one or more second flow TCAM entries of a second of said plurality of data flows into said second partition in a predetermined order;

setting bit values of a corresponding mask for each of said first TCAM entries and said second TCAM entries such that bits of said respective first TCAM entries and said second TCAM entries are individually masked by said masks; and comparing a prefix comprising predetermined packet header information of an incoming packet to said loaded one or more first TCAM entries and one or more second TCAM entries such that a matching said one or more first TCAM entries subsumes any matching said one or more second TCAM entries.

2. The method of claim 1 where said first plurality of data flows are MPLS or IPVPN flows.

3. The method of claim 1 wherein said second plurality of data flows are policy based routing flows.

4. The method of claim 3 wherein said policy based routing flows are access control list (ACL) flows.

5. The method of claim 3 wherein said policy based routing flows are traffic manager flows.

6. The method of claim 1 further comprising the steps of: maintaining a flow index space having entries corresponding to said TCAM; and determining said predetermined order of said first TCAM entries and said predetermined order of said second TCAM entries in said flow index space before said steps of loading said one or more first TCAM entries and loading said one or more second TCAM entries.

7. The method of claim 2 wherein said MPLS or IP-VPN flows are classified by connection index (CIX) and destination address (DA), CIX only or DA only.

8. The method of claim 7 wherein said first partition is divided into a first portion and a second portion, said first portion includes indices having highest priority ranging from said lowest index to a gMaxCixDaFix index and said second portion includes indices having lowest priority ranging from a gMinDaOnlyFix index to said partition index and said flows classified by CLX and DA and CIX only are assigned to said first portion and said flows classified by DA only are assigned to said second portion.

9. The method of claim 8 wherein said flows classified by CIX and DA and said flows classified by CIX only are loaded into said first portion starting at said gMaxCixDaFix index and said flows classified by said DA only are loaded in said second portion starting at said gMinDaOnlyFix index.

10. The method of claim 9 wherein said first partition is divided into a first portion and a second portion, said first portion includes indices having highest priority ranging from said lowest index to a gMaxCixDaFix index and said second portion includes indices having lowest priority ranging from a gMinDaOnlyFix index to said partition index, said gMaxCixDaFix index being adjacent to said gMinDaOnlyFix index and a free entry being positioned below said gMinDaOnlyFix index in said second portion and further comprising the steps of:

(a) moving a flow classified by DA only at said gMinDaOnlyFix index to said free entry;

(b) assigning a flow classified by CIX and DA or CIX only to said gMinDaOnlyFix index after step (a);

(c) setting the gMaxCixDaFix index at the index assigned to said flow classified by CIX and DA or CIX only in step (b); and
(d) setting the gMinDaOnlyFix index immediately after the index assigned to said 10 flow classified by CIX and DA or CIX only in step (b).

11. The method of claim 10 further comprising the steps of:
ordering said loaded one or more flows classified by CIX and DA or CIX only which are between said lowest index and said gMaxCixDaOnlyFix index for subsuming ordering; and
ordering said loaded one or more flows classified by DA only which are between said gMinDaOnlyFix index and said partition index for subsuming ordering.

12. The method of claim 9 wherein said first partition is divided into a first portion and a second portion, said first portion includes indices having highest priority ranging from said lowest index to a gMaxCixDaFix index and said second portion includes indices having lowest priority ranging from a gMinDaOnlyFix index to said partition index, said gMaxCixDaFix index being adjacent to said gMinDaOnlyFix index and a free entry being positioned above said gMinDaOnlyFix index in said second portion and further comprising the steps of:
(a) moving a flow classified by CIX and DA or CIX only at said gMaxCixDaFix to said free entry;
(b) assigning a flow classified by DA only to said gMaxCixDaFix index after step (a);
(c) setting the gMinDaOnlyFix index at the index assigned to said flow classified by DA only in step (b); and
(d) setting the gMaxCixDaFix entry immediately before the index assigned to said flow classified by DA only in step (b).

13. The method of claim 12 further comprising the steps of:
ordering said loaded one or more flows classified by DA only which are between said partition index and said gMinDaOnlyFix index for subsuming ordering; and
ordering said loaded one or more flows classified by CLX and DA or CLX only between said gMaxCixDaFix index and said lowest index for subsuming ordering.

14. The method of claim 7 further comprising the steps of: maintaining a flow index space having entries corresponding to said TCAM; and assigning said flows classified by CIX and DA and CIX only to a CIX prefix tree.

15. The method of claim 7 further comprising the steps of: maintaining a flow index space having entries corresponding to said TCAM; and
assigning said flows classified by DA only to a DA prefix tree.

16. The method of claim 7 further comprising the step of: removing a flow in said TCAM by freeing up a corresponding said entry in said 20 flow index space and invalidating a corresponding said TCAM entry.

17. The method of claim 1 wherein said predetermined order of said first partition has one of said TCAM entries with a longest prefix located at an index having highest priority followed by decreasing prefix values with a shortest prefix at an index having lowest priority.

18. The method of claim 3 wherein said second partition is divided into a first portion and a second portion, said first portion includes indices having highest priority ranging from a lowest index in said second partition to a GACL-partition index and said second portion includes indices having lowest priority ranging from said GACL-partition index to said highest index, said ACL flows ar global access list flows are assigned to said second portion.

19. The method of claim 18 wherein said ACL flow specifies a range of source or destination ports, and further comprising the step of:
mapping said ACL flow to multiple flows in said TCAM wherein said mask for each of said multiple flows covers a portion of said range of source or destination ports for optimally determining a number of flows to cover said portion of said range.

20. The method of claim 18 further comprising the step of: maintaining a flow index space having entries corresponding to said TCAM.

21. The method of claim 20 further comprising the steps of:
removing a flow in said TCAM by freeing up a corresponding said entry in said 15 flow index space and invalidating a corresponding said TCAM entry; and
compacting said flows in said TCAM by moving each remaining said TCAM entry up by one index.

22. The method of claim 19 further comprising the steps of:
maintaining a flow index space having entries corresponding to said TCAM.

23. The method of claim 22 further comprising the step of:
removing said multiple flows in said TCAM by freeing up corresponding said entries in said flow index space and invalidating said corresponding entries in said TCAM entry; and
compacting said flows in said TCAM by moving each remaining said TCAM entry up by one or more indices.

24. A method for classifying a plurality of data flows in a router comprising the steps of:
partitioning a ternary content addressable memory (TCAM) into at least a first partition and a second partition, said first partition includes indices having highest priority ranging from a lowest index to a partition index and said second partition includes indices having lowest priority ranging from a highest index to said partition index;
loading one or more first flow TCAM entries of a first of said plurality of data flows into said first partition in a predetermined order;
loading one or more second flow TCAM entries of a second of said plurality of data flows into said second partition in a predetermined order;
setting bit values of a corresponding mask for each of said first TCAM entries and said second TCAM entries such that bits of said respective first TCAM entries and said second TCAM entries are individually masked by said masks; and
comparing a prefix comprising predetermined packet header information of an incoming packet to said loaded one or more first TCAM entries and one or more second TCAM entries such that a matching said one or more first TCAM entries subsumes any matching said one or more second TCAM entries,
wherein said first plurality of data flows are MPLS or IP-VPN flows and said second plurality of data flows are policy based routing flows.

25. A method for classifying a plurality of data flows in a router comprising the steps of:
partitioning a ternary content addressable memory (TCAM) into at least a first partition and a second partition, said first partition includes indices having highest priority ranging from a lowest index to a partition index and said second partition includes indices having lowest priority ranging from a highest index to said partition index;

loading one or more first flow TCAM entries of a first of said plurality of data flows into said first partition in a predetermined order;

loading one or more second flow TCAM entries of a second of said plurality of data flows into said second partition in a predetermined order;

setting bit values of a corresponding mask for each of said first TCAM entries and said second TCAM entries such that bits of said respective first TCAM entries and said second TCAM entries are individually masked by said masks;

comparing a prefix comprising predetermined packet header information of an incoming packet to said loaded one or more first TCAM entries and one or more second TCAM entries such that a matching said one or more first TCAM entries subsumes any matching said one or more second TCAM entries;

maintaining a flow index space having entries corresponding to said TCAM; and determining said predetermined order of said first TCAM entries and said predetermined order of said second TCAM entries in said flow index space before said steps of loading said one or more first TCAM entries.

26. A system for classifying a plurality of data flows in a router comprising:

means for partitioning a ternary content addressable memory (TCAM) into at least a first partition and a second partition, said first partition includes indices having highest priority ranging from a lowest index to a partition index and said second partition includes indices having lowest priority ranging from a highest index to said partition index;

means for loading one or more first flow TCAM entries of a first of said plurality of data flows into said first partition in a predetermined order;

means for loading one or more second flow TCAM entries of a second of said plurality of data flows into said second partition in a predetermined order;

means for setting bit values of a corresponding mask for each of said first TCAM entries and said second TCAM entries such that bits of said respective first TCAM entries and said second TCAM entries are individually masked by said masks; and means for comparing a prefix comprising packet header information of in incoming packet to predetermined said loaded one or more first TCAM entries and one or more second TCAM entries, wherein a matching said one or more first TCAM entries subsumes an matching said one or more second TCAM entries.

27. The system of claim 26 where said first plurality of data flows are MPLS or LP-VPN flows.

28. The system of claim 26 wherein said second plurality of data flows are policy based routing flows.

29. The system of claim 28 wherein said policy based routing flows are access control list (ACL) flows.

30. The system of claim 28 wherein said policy based routing flows are traffic manager flows.

31. The system of claim 26 further comprising:

means for maintaining a flow index space having entries corresponding to said 15 TCAM; and means for determining said predetermined order of said first TCAM entries and said predetermined order of said second TCAM entries in said flow index space.

32. The system of claim 27 wherein said MPLS or IP-VPN flows are classified by connection index (CLX) and destination address (DA), CIX only or DA only.

33. The system of claim 32 wherein said first partition is divided into a first portion and a second portion, said first portion includes indices having highest priority ranging from said lowest index to a gMaxCixDaFix index and said second portion includes indices having lowest priority ranging from a gMinDaOnlyFix index to said partition index and said flows classified by CLX and DA and CLX only are assigned to said first portion and said flows classified by DA only are assigned to said second portion.

34. The system of claim 33 wherein said flows classified by CIX and DA and said flows classified by CIX only are loaded into said first portion starting at said gMaxCixDaFix index and said flows classified by said DA only are loaded in said second portion starting at said gMinDaOnlyFix index.

35. The system of claim 32 further comprising:

means for maintaining a flow index space having entries corresponding to said TCAM; and assigning said flows classified by CIX and CLX only to a CIX prefix tree.

36. The system of claim 32 wherein said first partition is divided into a first portion and a second portion, said first portion includes indices having highest priority ranging from said lowest index to a gMaxCixDaFix index and said second portion includes indices having lowest priority ranging from a gMinDaOnlyFix index to said partition index, said gMaxCixDaFix index being adjacent to said gMinDaOnlyFix index and a free entry being positioned below said gMinDaOnlyFix index in said second portion and further comprising:

means for moving a flow classified by DA only at said gMinDaOnlyFix index to said free entry;

means for assigning a flow classified by CLX and DA or CLX only to said gMinDaOnlyFix index;

means for setting the gMaxCixDaFix index at the index assigned to said flow 20 classified by CIX and DA or CIX only; and means for setting the gMinDaOnlyFix index immediately after the index assigned to said flow classified by CIX and DA or CIX only.

37. The system of claim 36 further comprising:

means for ordering said loaded one or more flows classified by CIX and DA or CIX only which are between said lowest index to said gMaxCixDaOnlyFix index for subsuming ordering; and means for ordering said loaded one or more flows classified by DA only which are between said gMinDaOnlyFix index and said partition index for subsuming ordering.

38. The system of claim 32 wherein said first partition is divided into a first portion and a second portion, said first portion includes indices having highest priority ranging from said lowest index to a gMaxCixDaFix index and said second portion includes indices having lowest priority ranging from a gMinDaOnlyFix index to said partition index, said gMaxCixDaFix index being adjacent to said gMinDaOnlyFix index and a free entry being positioned above said gMinDaOnlyFix index in said second portion and further comprising:

means for moving a flow classified by CIX and DA or CIX only at said gMaxCixDaFix to said free entry;

means for assigning a flow classified by DA only to said gMaxCixDaFix index; means for setting the gMinDaOnlyFix index at the index assigned to said flow classified by DA only; and means for setting the gMaxCixDaFix entry immediately before the index assigned to said flow classified by DA only.

39. The system of claim 36 wherein said first partition is divided into a first portion and a second portion, said first portion includes indices having highest priority ranging from said lowest index to a gMaxCixDaFix index and said second portion includes indices having lowest priority ranging from a gMinDaOnlyFix index to said partition index, said gMaxCixDaFix index being adjacent to said gMinDaOnlyFix index and a free entry being positioned above said gMinDaOnlyFix index in said second portion and further comprising:
means for moving a flow classified by CIX and DA or CIX only at said gMaxCixDaFix to said free entry;
means for assigning a flow classified by DA only to said gMaxCixDaFix index; means for setting the gMinDaOnlyFix index at the index assigned to said flow classified by DA only; and
means for setting the gMaxCixDaFix entry immediately before the index assigned to said flow classified by DA only.

40. The system of claim 32 further comprising:
means for maintaining a flow index space having entries corresponding to said TCAM; and
means for assigning said flows classified by DA only to a DA prefix tree.

41. The system of claim 40 further comprising:
means for removing a flow in said TCAM by freeing up a corresponding said entry in said flow index space and invalidating a corresponding said TCAM entry.

42. The system of claim 26 wherein said predetermined order of said first partition has one of said TCAM entries with a longest prefix located at an index having highest priority followed by decreasing prefix values with a shortest prefix at an index having lowest priority.

43. The system of claim 28 wherein said second partition is divided into a first is portion and a second portion, said first portion includes indices having highest priority ranging from a lowest index in said second portion to a GACL-partition index and said second portion includes indices having lowest priority ranging from said GACL-partition index to said highest index, said ACL flows are assigned to said first portion and global access list flows are assigned to said second portion.

44. The system of claim 43 wherein said ACL flow specifies a range of source or destination ports, and further comprising:
means for mapping said ACL flow to multiple flows in said TCAM wherein said mask for each of said multiple flows covers a portion of said range of source or destination ports.

45. The system of claim 43 further comprising:
means for maintaining a flow index space having entries corresponding to said TCAM.

46. The system of claim 45 further comprising:
means for removing a flow in said ICAM by freeing up a corresponding said entry in said flow index space and invalidating a corresponding said TCAM entry; and
means for compacting said flows in said TCAM by moving each remaining said TCAM entry up by one or more indices.

47. The system of claim 44 further comprising:
means for maintaining a flow index space having entries corresponding to said TCAM.

48. The system of claim 47 further comprising:
means for removing said multiple flows in said TCAM by freeing up corresponding said entries in said flow index space and invalidating said corresponding entries in said TCAM entry; and means for compacting said flows in said TCAM by moving each remaining said 15 TCAM entry up by one or more indices.

49. A system for classifying a plurality of data flows in a router comprising:
means for partitioning a ternary content addressable memory (TCAM) into at least a first partition and a second partition, said first partition includes indices having highest priority ranging from a lowest index to a partition index and said second partition includes indices having lowest priority ranging from a highest index to said partition index;
means for loading one or more first flow TCAM entries of a first of said plurality of data flows into said first partition in a predetermined order;
means for loading one or more second flow TCAM entries of a second of said plurality of data flows into said second partition in a predetermined order;
means for setting bit values of a corresponding mask for each of said first TCAM entries and said second TCAM entries such that bits of said respective first TCAM entries and said second TCAM entries are individually masked by said masks; and
means for comparing a prefix comprising predetermined packet header information of an incoming packet to said loaded one or more first TCAM entries and one or more second TCAM entries such that a matching said one or more first TCAM entries subsumes any matching said one or more second TCAM entries,
wherein said first plurality of data flows are MPLS or IP-VPN flows and said second plurality of data flows are policy based routing flows.

50. A system for classifying a plurality of data flows in a router comprising:
means for partitioning a ternary content addressable memory (TCAM) into at least a first partition and a second partition, said first partition includes indices having highest priority ranging from a lowest index to a partition index and said second partition includes indices having lowest priority ranging from a highest index to said partition index;
means for loading one or more first flow TCAM entries of a first of said plurality of data flows into said first partition in a predetermined order;
means for loading one or more second flow TCAM entries of a second of said plurality of data flows into said second partition in a predetermined order;
means for setting bit values of a corresponding mask for each of said first TCAM entries and said second TCAM entries such that bits of said respective first TCAM entries and said second TCAM entries are individually masked by said masks;
means for comparing a prefix comprising predetermined packet header information of in incoming packet to said loaded one or more first TCAM entries and one or more second TCAM entries such that a matching said one or more first TCAM entries subsumes an matching said one or more second TCAM entries;
means for maintaining a flow index space having entries corresponding to said TCAM; and
means for determining said predetermined order of said first TCAM entries and said predetermined order of said second TCAM entries in said flow index space before said steps of loading said one or more first TCAM entries.

51. An apparatus for classifying a plurality of data flows in a routing system comprising:
a ternary content addressable memory (TCAM);
a partitioning algorithm for partitioning said TCAM into at least a first partition and a second partition, said first partition includes indices having highest priority ranging from a lowest index to a partition index and said second partition includes indices having lowest priority ranging from a highest index to said partition index;
a loading algorithm for selecting a respective mask value to structure one or more first flow TCAM entries of a first of said data flows and one or more second flow TCAM entries and said respective mask values into said second partition; and
a search algorithm for performing an associative comparison of a prefix comprising predetermined packet header information of an incoming packet to said loaded one or more first flow TCAM entries and one or more second flow TCAM entries of a first of said plurality of data flows into said first partition in a predetermined order such that a matching said one or more first TCAM entries subsumes an matching said one or more second TCAM entries.

52. The apparatus of claim 51 wherein said first plurality of data flows are MPLS or IP-VPN flows.

53. The apparatus of claim 51 wherein said second plurality of data flows are policy based routing flows.

54. The apparatus of claim 51 wherein said partitioning algorithm and said loading algorithm are implemented in flow index space having entries corresponding to said TCAM and said predetermined order of said first TCAM entries and said predetermined order of said second TCAM entries is represented in said flow index space.

55. The apparatus of claim 52 wherein said MPLS or IP-VPN flows are classified by connection index (CIX) and destination address (DA), CIX only or DA only.

56. The apparatus of claim 55 wherein said first partition is divided into a first portion and a second portion, said first portion includes indices having highest priority ranging from said lowest index to a gMaxCixDaFix index and said second portion includes indices having lowest priority ranging from a gMinDaOnlyFix index to said partition index and said flows classified by CIX and DA and CIX only are assigned to said first portion and said flows classified by DA only are assigned to said second portion.

57. The apparatus of claim 56 wherein said flows classified by CIX and DA and flows classified by CIX only are loaded into said first portion starting at a beginning of said TCAM and ending at said gMaxCixDaFix index and said flows classified by said DA only are loaded in said second portion starting at said gMinDaOnlyFix index.

58. The apparatus of claim 52 further comprising:
means for maintaining a flow index space having entries corresponding to said TCAM; and means for assigning said flows classified by CIX to a CIX prefix tree.

59. The apparatus of claim 52 further comprising:
means for maintaining a flow index space having entries corresponding to said TCAM; and means for assigning said flows classified by DA only to a DA prefix tree.

60. The apparatus of claim 59 further comprising:
means for removing a flow in said TCAM by freeing up a corresponding said entry in said flow index space and invalidating a corresponding said TCAM entry.

61. The apparatus of claim 52 wherein said predetermined order of said first partition has one of said TCAM entries with a longest prefix located at an index having highest priority followed by decreasing prefix values with a shortest prefix at an index having lowest priority.

62. The apparatus of claim 53 wherein said second partition is divided into a first portion and a second portion, said first portion includes indices having highest priority ranging from a lowest index in said second partition to a GACL-partition index and said second portion includes indices having lowest priority ranging from said GACL-partition index to said highest index in said second partition, said ACL flows are assigned to said first portion and global access list flows are assigned to said second portion.

63. The apparatus of claim 62 wherein said ACL flow specifies a range of source or destination ports, and further comprising:
means for mapping said ACL flow to multiple flows in said TCAM wherein said mask for each of said multiple flows covers a portion of said range of source or destination ports.

64. The apparatus of claim 62 further comprising:
means for maintaining a flow index space having entries corresponding to said TCAM.

65. The apparatus of claim 64 further comprising:
means for removing a flow in said TCAM by freeing up a corresponding said 20 entry in said flow index space and invalidating a corresponding said TCAM entry; and
means for compacting said flows in said TCAM by moving each remaining said TCAM entry up by one index.

66. The apparatus of claim 62 further comprising:
means for maintaining a flow index space having entries corresponding to said TCAM.

67. The apparatus of claim 62 further comprising:
means for removing said multiple flows in said TCAM by freeing up 30 corresponding said entries in said flow index space and invalidating said corresponding entries in said TCAM entry; and
means for compacting said flows in said TCAM by moving each remaining said TCAM entry up by one or more indices.

* * * * *